United States Patent [19]

Aramaki et al.

[11] Patent Number: 4,964,137
[45] Date of Patent: Oct. 16, 1990

[54] METHOD OF REFINING RARE GAS FLUORIDE EXCIMER LASER GAS

[75] Inventors: Minoru Aramaki, Tokyo; Shinsuke Nakagawa, Ube; Hisaji Nakano, Ube; Hiroshi Ichimura, Ube; Masahiro Tainaka, Ube, all of Japan

[73] Assignee: Central Glass Company, Limited

[21] Appl. No.: 466,930

[22] Filed: Jan. 18, 1990

[30] Foreign Application Priority Data

Jan. 30, 1989 [JP] Japan .................... 64-120284

[51] Int. Cl.[5] .................................. H01S 3/22
[52] U.S. Cl. ................................ 372/59; 372/57
[58] Field of Search ................. 372/58, 59, 55, 57

[56] References Cited

U.S. PATENT DOCUMENTS

| | | | |
|---|---|---|---|
| 4,674,090 | 6/1987 | Turner | 372/59 |
| 4,722,090 | 1/1988 | Haruta et al. | 372/59 |
| 4,740,982 | 4/1988 | Hakuta et al. | 372/59 |

Primary Examiner—Leon Scott, Jr.
Attorney, Agent, or Firm—Fleit, Jacobson, Cohn, Price, Holman & Stern

[57] ABSTRACT

A laser gas used in a rare gas fluoride excimer laser is efficiently refined with little loss of the principal rare gas such as Ar, Kr or Xe by sequential contact of the laser gas first with a reactive metal, e.g. Si or Fe, for conversion of the fluorine source gas such as $F_2$ or $NF_3$ to a metal fluoride, then with a solid alkaline compound, e.g. $Ca(OH)_2$, for conversion of gaseous fluorides to solid metal fluorides, next with zeolite which is adsorbent of most of the remaining impurities and finally with an alkaline metal, e.g. Ca or Na, for decomposition of $CF_4$ to form a solid metal fluoride and carbon. $CF_4$ is formed during operation of the excimer laser by reaction of fluorine with a fluororesin used as electrical insulator in the laser apparatus, and accumulation of $CF_4$ in the laser gas caused significal lowering of the laser output power.

8 Claims, 1 Drawing Sheet

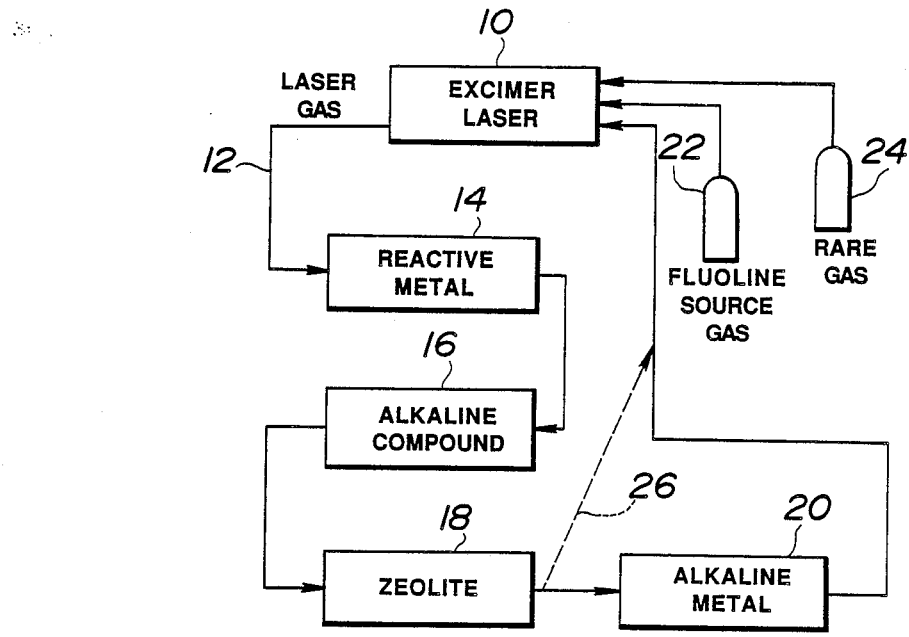

METHOD OF REFINING RARE GAS FLUORIDE EXCIMER LASER GAS

BACKGROUND OF THE INVENTION

This invention relates to a method of refining a laser gas used in a rare gas fluoride excimer laser.

As high-output ultraviolet lasers, applications of excimer lasers using a rare gas fluoride excimer such as ArF, KrF or XeF have rapidly expanded in the manufacture of semiconductor devices, in photochemical reactions and in many other fields.

A rare gas fluoride excimer laser uses a mixed gas which is comprised of a selected rare gas such as Ar, Kr or Xe, a fluorine source gas such as $F_2$ or $NF_3$ and an inert diluent gas such as He or Ne. The fluorine source gas is a highly reactive gas which readily reacts with surrounding materials such as the laser container materials. Therefore, it is inevitable that during operation of the excimer laser some impurity fluorine compounds are formed in the laser gas while the concentration of the fluorine source gas gradually decreases. As the laser gas is deteriorated in such a manner the output power of the excimer laser lowers considerably, so that the excimer laser cannot continuously be operated for a long period of time, if no countermeasure is taken.

In industrial applications of rare gas fluoride excimer lasers it is impermissible to simply dispose of deteriorated laser gas and replace it by a fresh laser gas since very expensive rare gases are used.

U.S. Pat. No. 4,740,982 shows a method of refining a laser gas used in a rare gas fluoride excimer laser by sequential treatments of the laser gas with selected reactive and absorptive agents. First the laser gas is brought into contact with a metal high in reactivity with fluorine, such as Si or Fe by way of example, to convert the fluorine source gas such as $F_2$ or $NF_3$ to a metal fluoride. Next, the laser gas is brought into contact with a solid compound of an alkali metal or an alkaline earth metal, such as $Ca(OH)_2$ or soda lime by way of example, to convert most of gaseous fluorides into solid metal fluorides. The remaining portion of the laser gas is brought into contact with zeolite to remove the remaining impurities by adsorption. The refined gas is a mixture of the principal rare gas such as Ar, Kr or Xe and another rare gas used as diluent. This rare gas mixture is returned to the excimer laser, and the laser is replenished with the fluorine source gas.

The laser gas refining process according to U.S. Pat. No. 4,740,982 can be performed during operation of the excimer laser, and this refining process is very effective for preventing lowering of the laser output power. However, even though the laser gas refining process is used the laser output power lowers considerably when the excimer laser is long operated. For example, a rare gas fluoride excimer laser can be operated to successively make $10^4$ shots of laser oscillation without significant lowering of the output power, but when the laser is further operated to make $10^5$ shots of laser oscillation in total the laser output power decreases considerably to the extent of about 50% of the initial level.

SUMMARY OF THE INVENTION

We have recognized and confirmed that the main reason for the lowering of the output power of a rare gas fluoride excimer laser provided with a laser gas refining system according to U.S. Pat. No. 4,740,982 is that $CF_4$ accumulates in the laser gas during long operation of the excimer laser and that $CF_4$ can hardly be removed by the refining method according to the patent. In excimer lasers it is usual to use a fluororesin such as polytetrafluoroethylene or polyvinylidene fluoride as electrical insulator. During operation of the excimer laser fluorine in the laser gas reacts with the fluororesin to form $CF_4$.

It is an object of the present invention to provide a method of efficiently refining a laser gas used in a rare gas fluoride excimera laser, which method includes a special step to remove $CF_4$ too from the laser gas.

According to the invention there is provided a method of refining a laser gas which is used in an excimer laser and comprises at least one rare gas, a fluorine source gas and impurities possibly including $CF_4$, the method comprising the steps of (a) bringing the laser gas into contact with a least one metal having high reactivity with the fluorine source gas to thereby convert the fluorine source gas to at least one metal fluoride, (b) after step (a), bringing the remaining portion of the laser gas into contact with at least one solid alkaline compound selected from alkali metal compounds and alkaline earth metal compounds to thereby convert most of fluorides in the gas into solid fluorides, (c) after step (b), bringing the remaining portion of the laser gas into contact with zeolite to thereby remove most of remaining impurities by adsorption, and (d) after step (c), bringing the remaining portion of the laser gas into contact with at least one metal selected from alkali metals and alkaline earth metals at an elevated temperature to thereby decompose $CF_4$ to form a solid metal fluoride and carbon.

As will be understood from the above statement, the present invention is based on the laser gas refining method shown in U.S. Pat. No. 4,740,982 and is characterized by the addition of the aforementioned step (d).

In the method according to the invention zeolite is used as an efficient adsorbent for many kinds of impurity compounds contained in excimer laser gases. However, when gaseous fluorine compounds high in reactivity and/or acidity such as $F_2$, HF, $SiF_4$, etc. are brought into contact with zeolite, zeolite undergoes chemical reaction with such compounds and hence loses adsorptive power in a short time and cannot be regenerated. Therefore, precedent to the contact with zeolite the laser gas is brought into contact with a solid alkaline compound such as, for example, CaO, $Ca(OH)_2$, NaOH, KOH or soda lime for removal of most of gaseous fluorides. However, if the fluorine source gas in the laser gas such as $F_2$, $NF_3$, $ClF_3$ or ClF is directly reacted with such an alkaline compound the reaction liberates oxygen gas. The presence of oxygen gas in the refined laser gas is undesirable since the conversion of oxygen to ozone in the excimer laser becomes a cause of lowering of the laser output power. In view of this matter, the laser gas is first brought into contact with a suitable metal such as, for example, Si or Fe to convert the fluorine source gas to a metal fluoride.

According to the invention, $CF_4$ is efficiently removed from the laser gas under refining by bringing the gas flowed out of a zeolite column into contact with an alkali metal such as Na, K or Li or an alkaline earth metal compound such as Ca at an elevated temperature. This treatment is made as the last step of the laser gas refining method because if $F_2$ gas, fluoride gases such as HF, $NF_3$ and $SiF_4$ and/or $H_2O$ come into contact with the alkaline metal there occur vigorous exothermic reactions which are dangerous and result in the consumption of a large amount of the expensive alkaline metal.

By using the present invention it is practicable to completely remove all impurity compounds from a rare gas fluoride excimer laser gas, and refining and recycling of the laser gas can be performed in a continuous manner during operation of the excimer laser so that the laser can be continuously operated for a long period of time without suffering from significant lowering of the laser output power.

BRIEF DESCRIPTION OF THE DRAWING

The single FIGURE is a block diagram showing the fundamental construction of an excimer laser gas refining system to perform the refining method according to the invention.

DESCRIPTION OF THE PREFERRED EMBODIMENTS

The single FIGURE shows a gas refining system to refine a laser gas extracted from an excimer laser apparatus 10 and recycle the refined gas to the laser apparatus 10. The excimer laser 10 uses a laser gas consisting essentially of a major amount of a rare gas such as Ar, Kr or Xe and a minor amount of a fluorine source gas high in reaction activities such as $F_2$, $NF_3$, $ClF_3$ or ClF. Usually the laser gas is diluted with an inert diluent gas such as He or Ne.

The laser gas is extracted from the excimer laser 10 and introduced, via line 12, into a reaction tube 14 packed with a reactive metal which reacts with the fluorine source gas in the laser gas such as $F_2$ or $NH_3$ to form a metal fluoride. The reactive metal can be selected from Si, Ge, P, Sb, S, Te, W, Mo and V each of which forms a gaseous metal fluoride such as, for example, $SiF_4$, $GeF_4$ or $PF_5$ and also from Fe, Cr, Mn, Co, Zn, Ti, Zr, Sn and Pb each of which forms a solid metal fluoride such as, for example, $FeF_3$, $CrF_3$ or $MnF_4$. If desired a mixture of two or more kinds of reactive metals can be used. In practice, Si or Fe will be used for economical reasons. It is suitable that the reactive metal in the tube 14 is in the form of granules or pellets about 1-5 mm in diameter for efficiently accomplishing the intended contact reaction without offering undue resistance to the flow of the laser gas and without suffering from choking of the reaction tube 14.

The reaction tube 14 is operated at an arbitrary temperature ranging from room temperature to about 500° C., though a suitable temperature depends on the kind of the reactive metal packed in the tube 14. For the activity of the reactive metal it is effective to keep the reaction tube 14 at a higher temperature, but this is unfavorable for the equipment and operation costs. When Si, W, Mo or S is used the intended reaction proceeds at a sufficiently high rate even at room temperature. Also when a different metal is used the reaction can be accomplished rapidly by operating the reaction tube 14 at temperatures ranging from about 100° C. to about 500° C.

The reaction of the metal in the tube 14 with the fluorine source gas such as $F_2$ or $NH_3$ forms a metal fluoride which is solid or gaseous depending on the kind of the metal. For example, in the case of using Fe, fluorine is trapped in the reaction tube 14 as a solid fluoride, $FeF_3$, and in the case of using Si fluorine is converted into a gaseous fluoride, $SiF_4$. The gaseous fluoride formed in the reaction tube 14 flows into a next reaction tube 16 together with the remaining components of the laser gas.

The reaction tube 16 is packed with a solid alkaline compound such as CaO, Ca(OH)2, NaOH, KOH or soda lime. The alkaline compound is granulated or pelletized so as to make good contact with the laser gas and so as not to be scattered by the flow of the laser gas. The reaction tube 16 can be operated at an arbitrary temperature ranging from room temperature to about 500° C. In practice, however, it is favorable to operate this reaction tube 16 at a temperature in the range from about 80° C. to about 200° C. with consideration of both the reactivity of the alkaline compound and ease of operation. The alkaline compound readily reacts with highly active fluorine compounds contained in the laser gas, such as HF, $OF_2$ and $SiF_4$, and also with $CO_2$, to form solid metal compounds.

The remaining portion of the laser gas is introduced into an adsorption tube 18 packed with zeolite. In this tube 18, most of the remaining impurities in the laser gas such as $H_2O$, $CClF_3$, $CCl_3F$, etc. are removed by adsorption. The zeolite in the tube 18 is selected from conventional synthetic zeolites with attention to the size of the micropores in zeolite according to the impurity gases to be removed. In general, for refining of laser gases used in excimer lasers the most suitable zeolite is Molecular Sieve 5A supplied from Linde Co. of U. S. A. It is also possible to use zeolite of a different class or a combination of two or more kinds of zeolite different in pore size. In the tube 18 the adsorption of the impurity compounds increases as the temperature is lower and as the pressure is higher. In practice the zeolite tube 18 is operated at a temperature between about −180° C. and about 100° C. and at an arbitrary pressure within the pressure limitation to the apparatus. When the adsorption of the zeolite in the tube 18 reaches saturation the adsorbed impurity compounds can easily be desorbed by a degassing treatment of the zeolite under heating, so that the adsorption power of the zeolite can be restored.

The impurities in the laser gas often include $CF_4$ gas, and in such a case $CF_4$ gas still remains in the gas flowed out of the zeolite tube 18 since $CF_4$ reacts with neither the reactive metal in the tube 14 nor the alkaline compound in the tube 16 and, because of poor polarity, is hardly adsorbed by zeolite in the tube 18. For removal of $CF_4$, the gas flowed out of the zeolite tube 18 is introduced into another reaction tube 20 which is packed with an alkali metal or an alkaline earth metal. Preferably the metal in the tube 20 is selected from Ca, Na, K and Li. If desired two or more kinds of metals may be used jointly. The physical form of the metal in the tube 20 is similar to that of the metal in the reaction tube 14. The metal in the reaction tube 20 is kept heated at temperatures above 400° C. to ensure complete reaction of $CF_4$ with the metal. For example, $CF_4$ readily reacts with Ca kept heated at a temperature above 450° C. to decompose and form $CaF_2$ and C. These solid products deposit within the reaction tube 20.

The gas flowed out of the zeolite tube 20 is a mixture of the principal rare gas such as Ar, Kr or Xe and the diluent gas such as He or Ne, and this gas is almost free of impurities. The thus refined rare gas mixture is returned to the excimer laser apparatus 10. Since the fluorine source gas such as $F_2$ or $NH_3$ is removed during the refining process the laser apparatus 10 is replenished with the fluorine source gas from a feed 22. Besides, a small amount of the principal rare gas is additionally supplied to the laser apparatus 10 from a feed 24 to compensate for a very small loss of the rare gase during the refining process.

The above described laser gas refining system can be operated continuously during operation of the excimer laser apparatus 10, and continuous refining of the laser gas is favorable for stabilization of the laser output power. However, it is also possible to intermittently operate the gas refining system. That is, the laser gas refining operation may be suspended until the laser output power lowers to a predetermined level by increase in the concentrations of impurities in the laser gas. In performing the laser gas refining operation it is possible to use the reaction tube 20 only intermittently according to the amount of accumulation of $CF_4$ in the laser gas.

EXAMPLE

The laser gas refining system of the FIGURE was provided to an ArF excimer laser of the discharge excitation type. The reaction tube 14 was packed with Si and maintained at room temperature. The reaction tube 16 was packed with soda lime and maintained at about 100° C. The adsorption tube 18 was packed with Molecular Sieve 5A and maintained at room temperature. The reaction tube 20 was packed with Ca and maintained at about 500° C. In the excimer laser apparatus 10 the total gas pressure was 2650 Torr. As to partial pressure, Ar was 145 Torr, $F_2$ was 5 Torr and Ne was 2500 Torr. The excimer laser was operated at an oscillation frequency of 80 Hz by application of a voltage of 39 kV, while the laser gas was continuously refined and recycled at a rate of 5 liters per minute. The laser operation was continued to successively make $10^8$ shots of oscillation. At the end of such operation the laser output power was still more than 90% of the initial level of 15 W.

COMPARATIVE EXAMPLE

The ArF excimer laser in the above Example was operated in the same manner. However, the laser gas refining system of Example was modified by providing a by-pass 26 to omit the use of the reaction tube 20 packed with Ca. Using the thus modified system the laser gas was continuously refined and recycled at a rate of 5 liters per minute, and the laser operation was continued to successively make $3 \times 10^5$ shots of oscillation. As a result, the laser output power decreased to 50% of the initial level, 15 W.

What is claimed is:

1. A method of refining a laser gas which is used in an excimer laser and comprises at least one rare gas, a fluorine source gas and impurities possibly including $CF_4$, the method comprising the steps of:
   (a) bringing the laser gas into contact with at least one metal having high reactivity with said fluorine source gas to thereby convert the fluorine source gas to at least one metal fluoride;
   (b) after step (a), bringing the remaining portion of the laser gas into contact with at least one solid alkaline compound selected from alkali metal compounds and alkaline earth metal compounds to thereby convert most of fluorides in the gas into solid fluorides;
   (c) after step (b), bringing the remaining portion of the laser gas into contact with zeolite to thereby remove most of remaining impurities by adsorption; and
   (d) after step (c), bringing the remaining portion of the laser gas into contact with at least one metal selected from the group consisting of alkali metals and alkaline earth metals at an elevated temperature to thereby decompose $CF_4$ to form a solid metal fluoride and carbon.

2. A method according to claim 1, wherein said at least one metal in step (a) is selected from the group consisting of Si, Ge, P, Sb, Te, S, W, Mo, V, Fe, Cr, Mn, Co, Zn, Sn, Pb, Ti and Zr.

3. A method according to claim 2, wherein said at least one metal in step (a) is maintained at a temperature in the range from room temperature to about 500° C.

4. A method according to claim 1, wherein said at least one alkaline compound is selected from the group consisting of CaO, Ca(OH)$_2$, NaOH, KOH and soda lime.

5. A method according to claim 4, wherein said at least one alkaline compound is maintained at a temperature in the range from about 80° C. to about 200° C.

6. A method according to claim 1, wherein said at least one metal in step (d) is selected from the group consisting of Ca, Na, K and Li.

7. A method according to claim 6, wherein said elevated temperature in step (d) is above 400° C.

8. A method according to claim 1, wherein said fluorine source gas is selected from the group consisting of $F_2$, $NH_3$, $ClF_3$ and ClF.

* * * * *